United States Patent [19]

Holtmann

[11] Patent Number: 4,846,604
[45] Date of Patent: Jul. 11, 1989

[54] DUMP FORMATION AND METHOD OF MONITORING AND REPAIRING LEAKAGES IN DUMPS

[75] Inventor: Günther Holtmann, Schillsdorf/Bokhorst, Fed. Rep. of Germany

[73] Assignee: Heers & Brockstedt, GmbH & Co., Fed. Rep. of Germany

[21] Appl. No.: 162,668

[22] Filed: Mar. 1, 1988

[30] Foreign Application Priority Data

Mar. 4, 1987 [DE] Fed. Rep. of Germany ....... 3706869

[51] Int. Cl.⁴ .............................. B09B 1/00; E02D 3/00
[52] U.S. Cl. .................................... 405/128; 405/129
[58] Field of Search ................... 405/36, 43, 50, 128, 405/129, 270; 210/170

[56] References Cited

U.S. PATENT DOCUMENTS

| | | |
|---|---|---|
| 4,430,021 | 2/1984 | Wagner et al. ..................... 405/129 |
| 4,696,599 | 9/1987 | Rakocznski et al. ................ 405/129 |
| 4,753,551 | 6/1988 | Brueggemann et al. ........... 405/128 |

Primary Examiner—David H. Corbin
Attorney, Agent, or Firm—McGlew & Tuttle

[57] ABSTRACT

There is involved a method for monitoring and possibly repair leakages in dumps with at least one lower seal inclined toward a control gallery, the lower seal being divided into leakage troughs and the leakage troughs being connected to control openings leading into the control galleries. If seepage water emerges from at least one control opening, an inspection pipe integrated in profiles or webs of a profile foil forming the leakage troughs is probed to locate the leak. Below the lower seal a control pipe is driven into the localized leakage area, so that also the tightness of the lower seal can be examined, and, depending on the testing of the seepage water, repair of the upper seal is either carried out immediately or is postponed. Immediate repair is necessary if the leak is already in the lower seal.

13 Claims, 3 Drawing Sheets

DUMP FORMATION AND METHOD OF MONITORING AND REPAIRING LEAKAGES IN DUMPS

BACKGROUND OF THE INVENTION

Field of the Invention

The invention relates, in general, to dump formation and control and, in particular, to a method for monitoring and possibly repairing leakages in dumps with a double floor seal comprising at least one lower seal inclined toward a control gallery and at least one upper seal as well as of a filter bed disposed between the two seals, the lower seal being subdivided into leakage troughs and the leakage troughs being connected to control openings leading into the control gallery.

Known is a double floor seal for dumps which has seal beds spaced from each other as well as an interposed filter bed. The filter bed has installed in it an injection conduit system, and also a control conduit system. The control system serves to detect leakages in the upper seal bed only, that is, if the upper seal bed has been destroyed for example by aggressive waste materials or by improper storage. In such a case, the filter bed is filled up with a hardening and sealing material via the injection conduit system. To be able to localize destruction of, or damage to, the upper seal bed, the floor seal is divided in grid fashion into test fields, which are each bulkheaded off from adjacent test fields by sealing connections of the seal beds and are connected with a water removal conduit via a walkable entry shaft and control gallery. These known measures for the monitoring and repairing of leakages in the floor seal are extremely costly because they require installing a control conduit system as well as an injection conduit system. Furthermore, the test fields do not permit quick localization. Besides, there is no control for the lower seal. Consequently it cannot be established whether, after damage to, or destruction of, the upper seal a leak has occurred also in the lower seal which must be repaired to prevent in good time discharge of seepage water or of gaseous pollutants that have entered the filter bed.

SUMMARY OF THE INVENTION

The invention provides a method for the monitoring of dumps, and to a dump, according to which leakages can be localized quickly and simply; and also control of the lower bed in the area of the leakage in the upper seal can be ensured.

The invention includes a method in which in a gas or water discharge from at least one control opening, an inspection pipe is driven into a respective leakage trough or into profiles bounding the leakage trough and the leak is located; and then a control pipe is driven in a controlled manner, in, or into, the leakage area or beyond it below the lower seal and the tightness of the lower seal is checked and, at least in case of leakage, in the lower seal also, the leaks are exposed —e.g. by a method used in mining—and both seals are repaired.

According to the invention, in case of leakage in the upper seal bed, two checks take place, namely a first check at the control opening in the control gallery from which seepage water or gaseous pollutants issue, as well as in the respective leakage trough or the bounding profiles themselves; and a second check is made below the lower seal in the leakage area. The localization of the leakage occurs both in the gallery's longitudinal axis through the control openings leading into the control gallery, and also perpendicular to the gallery's longitudinal axis in the particular leakage trough. To this end, an inspection pipe is driven forward in the respective leakage trough or the limiting profiles.

Under the invention it is possible also to install in the profiles bounding the leakage troughs, e.g. webs, a perforated inspection pipe from the start, and to probe it in case of leakage. The gaseous pollutants entering the control gallery or the seepage water flowing off therein are easy to examine or to analyze. If it is found after the probing that there is no danger to the lower seal, repair of the upper seal or of the leak is not immediately necessary, because a second control below the upper seal has been arranged, namely by means of the control pipe driven forward into the leakage area. If, on the contrary, there is danger also for the lower seal, the leak in the upper seal must be repaired immediately. At any rate, immediate repair of the upper seal is not absolutely necessary in each case of leakage, and moreover, under the invention, the installing of costly control conduit and injection conduit systems can be dispensed with. This is of special importance for the reason that, as experience shows, leakages occur singly and at some points in a double floor seal, and moreover, the floor plan or covered ground of modern dumps and in particular garbage dumps is extremely large. For these reasons, therefore, if a leak occurs only in the upper seal, it is exposed and repaired selectively, namely depending on whether there is danger also the lower seal.

Additional features essential to the invention will be enumerated in the following. As inspection pipe and control pipe, there are used expediently drain pipes with displacers and removable heads, which permit easy driving and yet allow the leakage areas to be observed with certainty. To achieve this, inspection or control equipments such as probes, cameras, gas tracing devices or the like are introduced preferably into the drain pipes, to detect gaseous pollutants or liquids.

The invention also relates to a dump, in particular a garbage dump, which is especially suitable for carrying out the claimed method, having entry shafts, control galleries, drain pipes and headers for gaseous pollutants or liquids and having a floor seal installed in roof form between the parallelly extending control galleries. The dump includes at least one lower seal and one upper seal with an interposed filter bed. This dump is characterized in that the lower seal has leakage troughs arranged side by side, and the leakage troughs extend toward the control galleries with a roof type inclination and are connected to control openings leading into the control galleries. This does away with the need for installing a control conduit system, as the lower seal functions jointly with the control galleries as a control system divided into coordinates. According to a special recommendation of the invention, at least the lower seal is formed as a plastic profile foil with profiles, e.g. webs, forming the leakage troughs. Also the upper seal may involve a plastic foil. A preferred embodiment of the invention provides that empty pipes with drain hoses or bores leading to the leakage troughs are inserted into the profiles or webs and inspection pipes can be introduced into the empty pipes, or the inspection pipes themselves are integrated directly into the webs and are connected to the leakage troughs via drain hoses or bores. According to the invention, the entry shafts and control galleries are made of plastic pipes or have a lining of such plastic pipes, the plastic pipes for the control galleries having the control openings. Further, the plastic pipes may have on the exterior below the control openings bearing surfaces for the lower seal to be connected, or for the welding on of the plastic profile foil. Thereby, a gas- and water-tight connection of the lower seal to the control galleries is achieved.

The advantages achieved by the invention must be seen essentially in that a method for monitoring leakages in the floor seal in dumps, and a dump, are realized whereby the leakage can be localized in an extremely simple and functional manner. Moreover, control also of the lower seal is brought about, so that repair of the upper seal can be dispensed with if and when, based on the probing of the issuing pollutants or liquids, damage to the lower seal is not to be feared. Here, the invention proceeds from the finding that seepage of, at any rate, liquids in the case of a leak in the upper seal in the filter bed between the two seals will always occur in a controlled manner vertically downward and not into adjacent filter bed zones in such a way that the control pipe driven forward below the lower seal into the leakage area will indeed satisfactorily detect a leak also of the lower seal in the leakage area of the upper seal.

Accordingly, it is an object of the invention to provide a dump formation for garbage over a subsoil which comprises a lower sealing bed extending over the upper soil, a plurality of laterally spaced-apart control gallery pipes extending through said lower seal and having a control opening on at least one side thereof, a plurality of substantially spaced-apart leakage troughs forming a part of said lower seal and extending toward and connected to the openings of the control gallery pipes and including a filter bed over the lower seal and an upper sealing bed over the filter bed.

A further object of the invention is to provide a method of monitoring and possibly repairing leakages in dumps for the dump which has a vertically-spaced double floor seal including at least one lower seal inclined toward a control gallery and an upper seal with a filter bed disposed between the two seals and wherein the lower seal is divided into leakage troughs which are connected to control openings of the control galleries and which comprises checking to determine if a fluid issued from at least one control opening and, if it does, driving an inspection pipe into the respective leakage trough or similar profiles which adjoin the leakage trough so as to locate the leakage and then driving a control pipe at least into the leakage area and below the lower seal and testing the tightness of the lower seal and when there is a leakage detected in the lower seal, exposing the leak and repairing both seals.

A further object of the invention is to provide a dump which is easy to form and is inexpensive to maintain and operate.

The various features of novelty which characterize the invention are pointed with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

GENERAL DESCRIPTION OF THE PREFERRED EMBODIMENT

Figure 1:
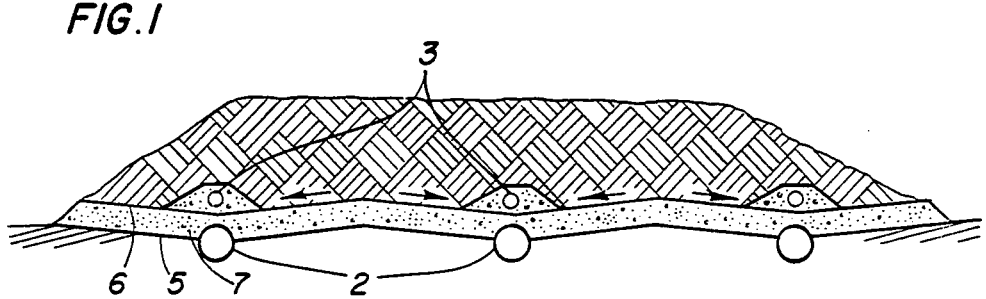
FIG. 1 is a schematic vertical section through a dump according to the invention.
Figure 2:
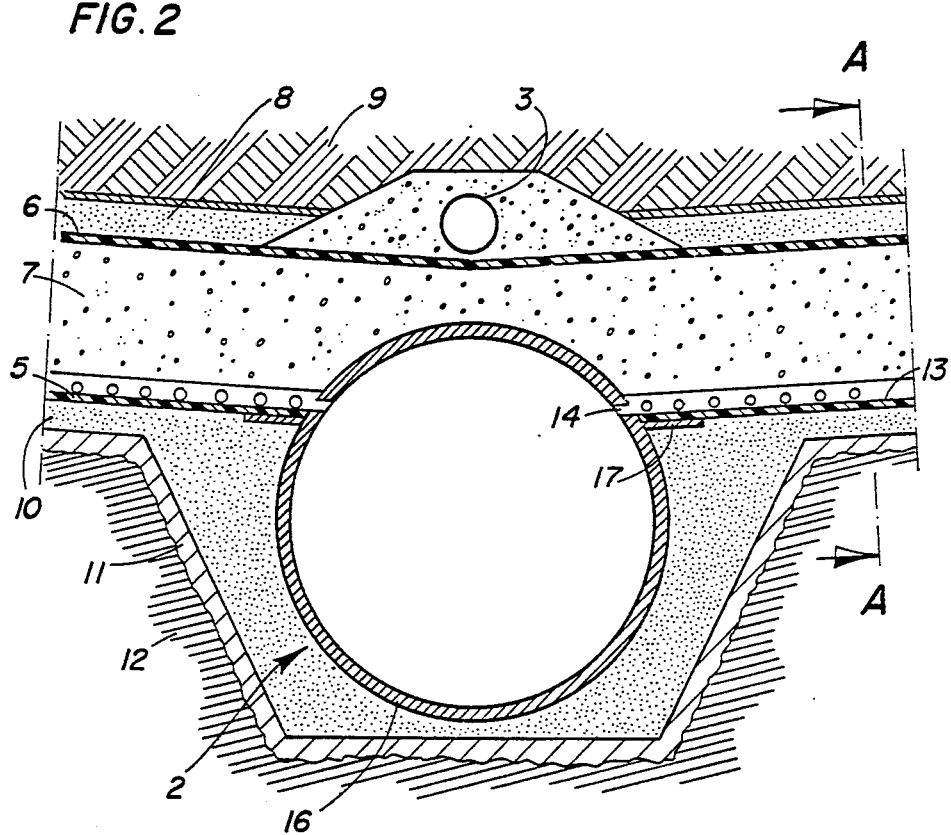
FIG. 2 is an enlarged detail of the dump according to FIG. 1.
Figure 3:
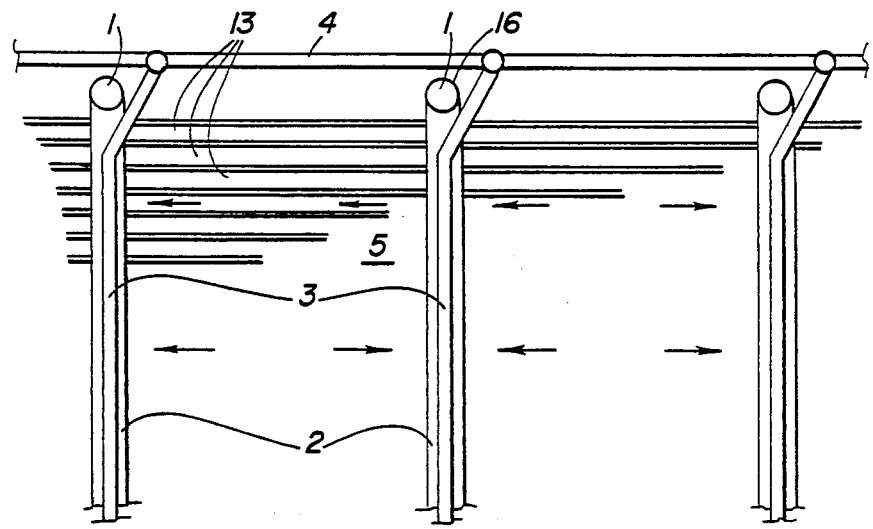
FIG. 3 is a partial top view of the dump of FIG. 1 in the region of the lower seal.
Figure 4:
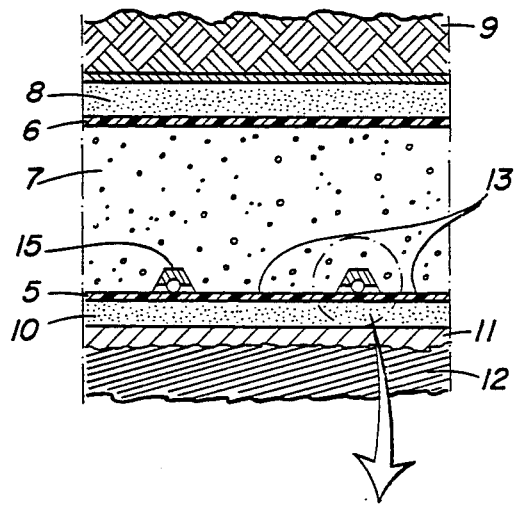
FIG. 4 is a vertical section taken along the line of FIG. 2.
Figure 4A:
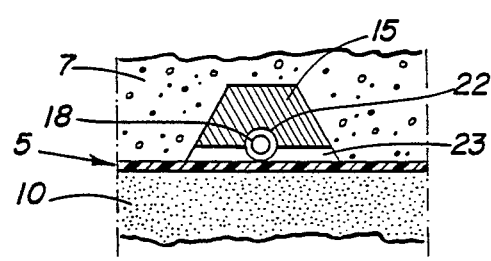
FIG. 4a is an enlargement of a portion of the dump as shown in FIG. 4.
Figure 5:
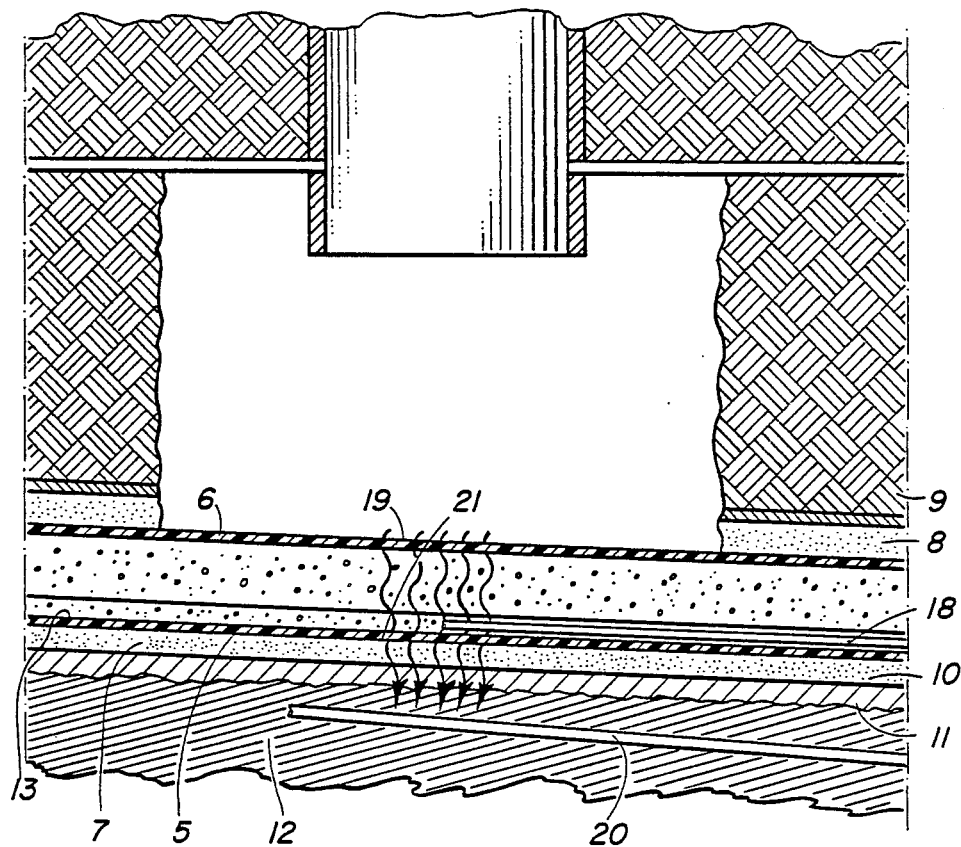
FIG. 5 is an enlarged partial sectional view of a leakage point exposed for repair.

Referring to the drawings, in particular, the invention embodied therein, as best seen in FIG. 2, comprises a dump formation particularly for garbage over a subsoil 12 and which comprises a lower sealing bed 5 extending over the subsoil and a plurality of laterally-spaced apart control galleries generally designated 2 which include pipes 16 having at least one side opening or control opening 14 into which one or more leakage troughs 13 of the lower seal extends and are connected thereto. The dump formation including a filter bed 7 over the lower seal 5 and an upper sealing bed 6.

The figures illustrate a dump, in particular a garbage dump, with entry shafts 1, control galleries 2, drain pipes 3, and headers 4 for gaseous pollutants and seepage water. Between the parallelly extending control galleries 2 is a floor sealing system installed like a roof, comprising at least one lower seal bed or seal 5 and one upper seal bed or seal 6 with an interposed filter bed 7. Above the upper seal 6 there is regularly a drain bed 8 (planar filter) and thereabove a protective bed 9 possibly on matting, below the lower seal 5 a fine fill 10, a coarse fill 11, and lastly the subsoil 12. The lower seal 5 includes leakage troughs 13 arranged side by side. The leakage troughs 13 slope in opposite directions from a fall line medially located between adjacent control galleries 2 toward the control galleries 2 in roof fashion and are connected to control openings 14 leading into the control galleries 2. At least the lower seal 5 is formed as plastic profile foil, e.g. webbed foil, with profiles, e.g. webs 15, forming the leakage troughs 13. But also the upper seal 6 may formed as a plastic foil or plastic sealing strip. The entry shafts 1 and control galleries 2 are made of plastic pipes 16. In this case, therefore, the plastic pipes 16 form, as it were, the shaft or gallery timbering. Another possibility is to use the plastic pipes 16 as lining. Always the plastic pipes 16 for the control galleries have the control openings 14. On the exterior of plastic pipes 16 have, below the control openings 14, bearing surfaces 17 for the lower seal 5 or plastic profile foil to be connected; they can be welded to the bearing surfaces 17 to produce a gas- and water-tight connection with the plastic pipes 16.

It is evident from the figures that, in case of gas or water discharge from at least one control opening 14, an inspection pipe 18 can be driven into the respective leakage trough 13 and the respective leak 19 can thus easily be located. What is shown, however, is an embodiment according to which there are inserted into the profiles or webs 15 empty pipes 22 with drain hoses or bores 23 leading to the leakage troughs 13 and inspection pipes 18 can be introduced into the empty pipes 22. According to a modified form of realization, the inspection pipes 18 can be integrated directly in the webs 15 and be connected to the leakage troughs 13 via drain hoses or bores 23. In all variants, below the lower seal 5 a control pipe 20 can driven in a controlled manner into the leakage area or even beyond, so that the tightness of the lower seal 5 can be examined. At least in case of leakage 21 and also in the lower seal 5, the leaks 19, 21 are exposed by methods used in mining—lowering of an entry shaft and removal of the garbage, so that the two seals 5, 6 can then be easily repaired. In case of a leak 19 only in the upper seal 6, repair is however not necessary if the lower seal 5 is not endangered. This can be determined by probing the issuing pollutants or liquids. Repair of the upper seal bed 6 is, in such a case, not necessary only for the reason that through the control pipe 20 introduced below the lower seal 5 sufficient safety or control exists in the leakage area precisely also for the lower seal 5.

While the specific embodiments of the invention have been shown and described in detail to illustrate the application of the principles of the invention, it will be understood that the invention may be embodied otherwise without departing from such principles.

What is claimed is:

1. A method for monitoring and possibly repairing leakages in dumps for a dump which has vertically spaced double floor seals including at least one lower seal inclined toward a control gallery and one upper seal and a filter bed disposed between the upper and lower seals and wherein the lower seal is subdivided into leakage troughs and the leakages troughs are connected to control openings leading into the control gallery, comprising checking to determine if a fluid issues from at least one control opening and, if it does, driving an inspection pipe into the respective leakage troughs or into similar profiles which bound the leakage troughs so as to locate the leakage, then driving a control pipe at least into the leakage area and below the lower seal, and testing the tightness of the lower seal, and at least in the case of leakage in the lower seal, exposing the leakage and repairing both seals.

2. A method according to claim 1, wherein in the case of a leakage in the upper seal only, the leak is partially exposed and repaired.

3. A method according to claim 1, wherein drain pipes which are used for inspection and control are installed with displacers and removal heads.

4. A method according to claim 1, wherein for inspection and control purposes, equipment is provided such as cameras the like, in the drain pipes, in order to detect fluid.

5. A dump formation for garbage over a subsoil, comprising a lower sealing bed extending over the subsoil, a plurality of laterally spaced-apart control gallery pipes extending through said lower seal and having a control opening on at least one side thereof, a plurality of leakage troughs in side-by-side relation and forming a part of said lower sealing bed extending toward and connected to the respective openings of said control gallery pipes, filter bed over said lower seal, and an upper sealing bed over said filter bed.

6. A dump formation according to claim 5, wherein at least a lower seal comprises a plastic foil having upstanding webs defining between them said leakage troughs.

7. A dump according to claim 6, including an empty pipe extending within respective webs and having drain bores leading to said leakage troughs said empty pipe being for receiving inspection pipes introduced into said empty pipe.

8. A dump according to claim 5, including entry shafts and control shafts formed of plastic pipes and forming said control galleries.

9. A dump according to claim 5, wherein said control galleries each comprise a plastic pipe having an opening on each side and bearing surfaces extending outwardly below said openings connected to and supporting said troughs of said lower seal.

10. A dump according to claim 6, including inspection pipes integrated directly into said webs and drain bores connecting the inspection pipes to the leakage troughs.

11. A dump according to claim 5 wherein the leakage troughs are inclined downwardly towards respective adjacent control gallery pipes from opposite sides of a fall line extending medially between the adjacent control gallery pipes.

12. A dump formation for garbage over a subsoil, comprising a lower sealing bed extending over the subsoil comprising a plastic foil formed with upstanding webs defining between them a plurality of leakage troughs extending side-by-side, a plurality of laterally spaced-apart control gallery pipes extending transversely of the leakage troughs through said lower seal, each control gallery pipe comprising a plastic pipe having a control opening on each side thereof and bearing surfaces extending outwardly below said openings supporting said leakage troughs connected to the respective openings of said control gallery pipes, empty pipes in respective webs having drain bores leading to said leakage troughs, each empty pipe being for receiving an inspection pipe, a filter bed over said lower seal, and an upper sealing bed over said filter bed.

13. A dump according to claim 12 wherein the leakage troughs are inclined downwardly towards respective adjacent control gallery pipes from opposite sides of a fall line extending medially between the adjacent control gallery pipes.

* * * * *